United States Patent [19]

Oshiro et al.

[11] Patent Number: 4,976,041
[45] Date of Patent: Dec. 11, 1990

[54] BASE-POINT ANCHOR

[76] Inventors: Gary T. Oshiro, 98-119 Kaulike Dr., Pearl City, Hi. 96782; Rodney N. Morisato, 1326 Akahai St., Kailua, Hi. 96734

[21] Appl. No.: 222,099

[22] Filed: May 24, 1988

[51] Int. Cl.⁵ ............................................. G01C 15/10
[52] U.S. Cl. ........................................ 33/392; 33/404; 33/414; 52/105
[58] Field of Search ................ 52/105, 410, 428, 698, 52/512, 406, 404, 363; 248/205.3, 205.4, 231.91; 428/138, 140; 33/392, 404, 413, 414; 156/291

[56] References Cited

U.S. PATENT DOCUMENTS

| | | |
|---|---|---|
| 909,846 | 1/1909 | Cavileer . |
| 1,017,390 | 2/1912 | Dittrich . |
| 1,098,033 | 5/1914 | Friendship . |
| 1,145,933 | 7/1915 | Spear et al. ............ 52/366 |
| 1,187,101 | 6/1916 | Rutland . |
| 1,803,723 | 5/1931 | Murphy ................ 52/366 |
| 2,711,030 | 6/1955 | Drew . |
| 2,793,887 | 5/1957 | Moore ................ 52/714 X |
| 2,918,282 | 12/1959 | Waterval . |
| 3,122,836 | 3/1964 | Aciego . |
| 3,246,439 | 4/1966 | Foster, Jr. et al. ........ 52/714 X |
| 3,622,436 | 11/1971 | Johnson ................ 428/139 |
| 3,662,471 | 5/1972 | Lynde . |
| 3,675,735 | 7/1972 | Bailey . |
| 3,675,886 | 7/1972 | Kampmier . |
| 3,976,274 | 8/1976 | Langguth . |
| 4,353,167 | 10/1982 | Martin . |
| 4,421,288 | 12/1983 | Blaszkowski . |
| 4,459,761 | 7/1984 | Bosco ................... 33/414 |
| 4,561,189 | 12/1985 | Hirneise . |
| 4,606,168 | 8/1986 | Fuhrer ................ 52/410 X |
| 4,778,702 | 10/1988 | Hunter, III ............ 248/205.3 X |
| 4,813,145 | 3/1989 | Josey, Jr. et al. ........ 33/756 X |
| 4,830,558 | 5/1989 | Sweeney .............. 248/205.3 X |

FOREIGN PATENT DOCUMENTS

| | | | |
|---|---|---|---|
| 592053 | 1/1960 | Canada ................... 33/756 |
| 623542 | 11/1961 | Canada ................... 33/756 |
| 173297 | 10/1952 | Fed. Rep. of Germany ... 248/205.3 |
| 793187 | 3/1935 | France .................... 33/414 |
| 805259 | 7/1936 | France ..................... 33/87 |
| 553446 | 8/1943 | United Kingdom ........... 33/87 |
| 2026902 | 5/1980 | United Kingdom ........... 248/205 |

OTHER PUBLICATIONS

Pp. 20 to 23 of catalog for "Vac-U-Rig" Products.

Primary Examiner—David A. Scherbel
Assistant Examiner—Lan Mai
Attorney, Agent, or Firm—Martin E. Hsia

[57] ABSTRACT

A base-point anchor that will allow anchoring of chalklines, plum bob lines, string for layout lines and tape rules, comprising a body with adhesive locking apertures and an anchor aperture and a bulk adhesive adhering to the body and extruded into the adhesive locking apertures.

6 Claims, 3 Drawing Sheets

BASE-POINT ANCHOR

BACKGROUND OF THE INVENTION

Layout work consists of accurately placing marks and lines on a surface in order to guide construction crews when installing building members or performing other work in a construction project. These lines and marks must be accurately placed in order to ensure that the various components of the building fit together properly. If the layout work is not done properly, the construction will not comply with the plans and specifications for the project and expensive remedial work will be necessary.

One of the basic tools for performing layout work is the chalkline, which is a string coated with chalk that will leave a chalk marking on a surface if the string is stretched tautly across the surface and plucked.

New technologically advanced tools have been introduced for layout work, such as electronic and laser leveling instruments, but these tools have not replaced the chalkline because they will not physically mark a surface for the benefit of the construction crew.

In using a chalkline, one person normally holds one end of the string at a specific point (the "base-point") and another person marks off the appropriate length of string, holds the other end of the chalkline, and plucks the string to form the chalk mark. One of these two people is usually a foreman or a supervisor trained in the interpretation of plans, specifications and manufacturers' or supplier's brochures. The other worker is usually untrained and merely clears the path for the chalkline and places and holds the chalkline string at the base-point during the marking process. While the trained foreman or supervisor is reviewing the plans and specifications or checking the dimensions for the layout work, the untrained person usually must wait around with nothing to do, which results in lost labor costs.

Layout work also involves the verification of "plumb" using a "plumb bob." Verifying "plumb" means to verify that a surface or other construction member is truly vertical. In verifying "plumb", a "plumb bob" is suspended from a string that is offset from the surface being checked. The distance of the string from that surface is measured at the top of the string and at the bottom of the string. If both measurements are the same, the surface is said to be "plumb." However, anchoring the "plumb bob" to the surface being checked is sometimes difficult. Therefore, the "plumb bob" line is often nailed or otherwise attached to the surface being checked, thereby leaving marks or damage in that surface.

Layout work sometimes involves using a carpenter's level to verify that markings on a vertical surface are horizontal. However, it is difficult to hold the level against the surface in the proper position and to verify the position of the markings simultaneously. Thus, there is a need for a base-point anchor that can adhere to the vertical surface and help suPport the level.

Layout work sometimes requires using chalklines or tape rules on ceilings. Thus, there is a need for a base-point anchor that can adhere upside down to a construction member.

Many attempts have been made to provide base-point anchors for chalklines, tape rules and string layout lines, but these all have disadvantages. On wood surfaces, a nail is often used as an anchor. Similarly, on concrete surfaces, a piece of wood is often nailed with concrete nails to the surface and then an additional nail is hammered into the wood. A concrete nail could be nailed directly into the concrete, but this is difficult to do accurately and is quite dangerous in pulling long lengths of string. Still another method employed is to drill a hole at the layout mark, insert a tight fitting nail and use the nail as a base-point anchor. However, this method is inconvenient because of the need to transport an electric drill and cord around the construction site.

All of the preceding methods result in damage to the surface and are time consuming.

It is therefore an object of this invention to provide a base-point anchor that is easily and quickly affixed to the surface of most construction members, horizontal, vertical or upside down, and will not permanently damage or mark the surface.

It is also an object of this invention to provide such a base-point anchor that is very economical, compact and easily transported.

It is a still further object of this invention to provide a base-point anchor that can be mounted on the vertical surface of a wall or other construction member for measuring "plumb."

SHORT STATEMENT OF THE INVENTION

These and other objects are achieved by a base-point anchor comprising a body with a bulk adhesive adhering to the bottom of the body. The body has a plurality of adhesive locking apertures and the bulk adhesive is extruded into these locking apertures so that the adhesive will remain attached to the body when the base-point anchor is removed from the surface. The body is also provided with an anchor aperture in which the hook of a chalkline or the end of a tape measure may be inserted. The body may be made of aluminium, for strength, weight, durability and ease of machining, or a transparent plastic, so that the layout marks can be viewed through the body and the spread of the adhesive can be verified.

Other objects, features and advantages of the present invention will become more fully apparent from the following detailed description of the preferred embodiments, the claims and the accompanying drawings.

DETAILED DESCRIPTION OF PREFERRED EMBODIMENTS

The preferred embodiments of the present invention are illustrated by way of example in FIGS. 1 through 6.

Figure 1:
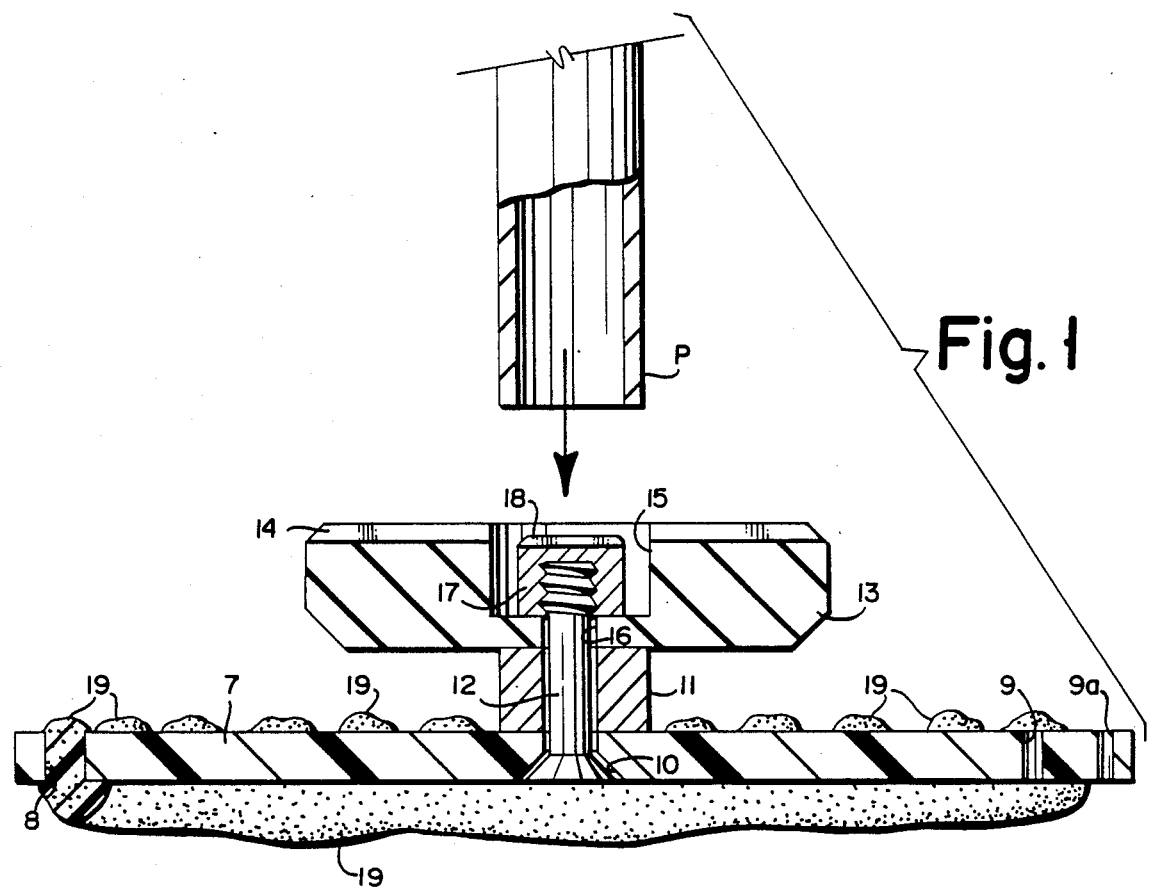
FIG. 1 is a sectional view of a first preferred embodiment of the present invention.
Figure 2:
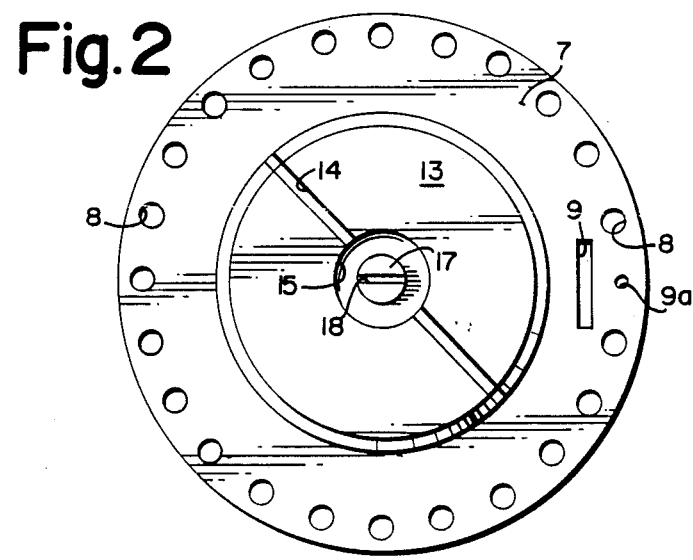
FIG. 2 is a top view of the embodiment shown in FIG. 1.

Referring specifically to FIGS. 1 and 2, a first preferred embodiment of the invention comprises a disk shaped body 7 having a plurality of adhesive locking apertures 8, a tape rule slot 9, a string hole 9a and a screw hole 10. A hollow cylindrical spacer collar 11 is attached to the disk shaped body 7 by a screw 12.

A thick circular handle 13, preferably made of metal, plastic or wood, having a plumb bob slot 14, a cylindrical pipe space 15 and a screw aperture 16 is mounted above the hollow cylindrical spacer collar 11 with the screw 12 projecting through the screw aperture 16. A threaded locking cap 17 having an integral screwdriver slot 18 is threaded onto the portion of the screw 12 projecting through the screw aperture 16, thereby locking the thick circular handle 13 onto the hollow cylindrical spacer collar 11.

A bulk adhesive 19 is applied along the periphery of the bottom of the disk shaped body 7 and extrudes through the adhesive locking apertures 8 and onto the other side of the disk shaped body 7, locking the bulk adhesive 19 into place. Thus, the bulk adhesive 19 will continue to adhere to the disk shaped body 7 when the base-point anchor is pulled away from the construction surface, rather than separating from the disk shaped body 7.

The cylindrical pipe space 15 allows the base-point anchor to be detachably mounted upside down on top of a hollow pipe P by placing the pipe P over the threaded locking cap 17 and into the cylindrical pipe space 15, thereby allowing the base-point anchor to be attached upside down to a ceiling, or to be attached to some other difficult to reach surface, using the pipe P to extend the user's reach. When it is desired to remove the base-point anchor, a transverse force can be applied to the pipe P, thereby allowing the base-point anchor to be levered off the surface to which it has adhered.

The bulk adhesive 19 should be applied with a thickness sufficient to insure adhesion, but should not be applied too thickly because the base-point anchor then would shift as the chalkline or tape rule is pulled. The thickness of the bulk adhesive 19 should be between ⅛ inch and ⅜ inch, and preferably ¼ inch.

The effectiveness of the bulk adhesive 19 depends on the surface area of the bulk adhesive 19 that adheres to the construction surface, which in turn depends on the size of the body 7 of the base-point anchor. For example, if the base-point anchor will be used for pulling a chalkline up to 100 feet long, the body 7 should be approximately 7 inches in diameter, because workers tend to pull quite hard when pulling a chalkline of this length. For shorter lengths of chalkline, the body 7 should be approximately 3 inches in diameter for compactness and ease of transportation. This size also would be convenient because it is the same diameter as most tape rules, so that the base-point anchor can be attached to the tape rule when not being used.

The bulk adhesive 19 must be pliable, bulky and adhere strongly to most construction surfaces. It must also be of sufficiently high tensile strength that it will not tear apart when the base-point anchor is removed from a construction surface to which it has adhered. It should also adhere to most construction materials quite readily without leaving a permanent mark or damaging the surface after removal. The adhesive should not harden and should remain pliable and adherent even after exposure to air, dust and other materials. It should also be removable and replaceable after it becomes too dirty for further use.

The preferred bulk adhesive is sold under the trademark "vogue Stickum" and is manufactured by Beagle Manufacturing Co., Inc., 4377 North Baldwin Avenue, El Monte, Calif. 91731. According to the manufacturer, this bulk adhesive is a mixture of oil based products and talcs that is mixed in heavy intensive mixtures and extruded at high pressure on paper. No further information about the composition of this bulk adhesive could be furnished by the manufacturer because the composition is a trade secret. This "Vogue Stickum" bulk adhesive is sold in a tape form and is used for floral arrangements and miscellaneous other adhesive purposes.

This "Vogue Stickum" bulk adhesive adheres quite readily to most construction materials, including concrete, CMU (concrete masonry units or hollow tile), ceramic tile, plastic laminate, gypsum wallboard, cement plaster, galvanized iron, copper, cast iron, pipes, porcelain, vinyl floor coverings, floor tiles, glass, roofing felt, plastics, stainless steel (not oily), structural steel (whether oily or primed), aluminium, most painted surfaces (including wood) and raw wood. However, it will not adhere very well if the surface is oily or dusty. "Vogue Stickum" bulk adhesive may leave a shadow or discoloration on certain surfaces, but the shadow or discoloration can be removed with white gasoline or naphtha. "Vogue Stickum" bulk adhesive becomes softer as it gets warmer and harder as it gets colder, and the preferred temperature range for use is between 50 degrees Fahrenheit and 95 degrees Fahrenheit. In colder weather, "Vogue Stickum" bulk adhesive can be made softer by kneading or by exposure to heat.

Figure 3:
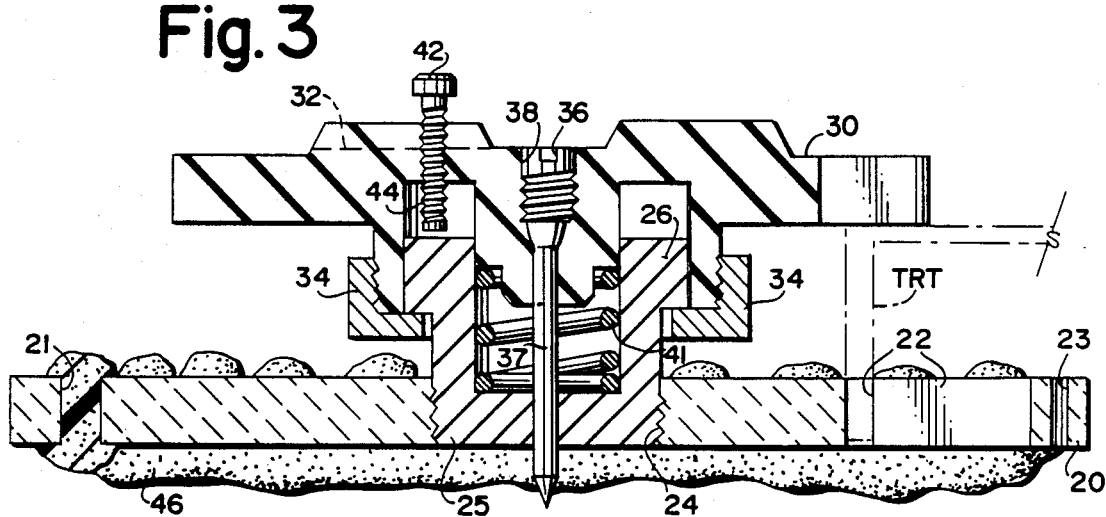
FIG. 3 is a sectional view of a second preferred embodiment of the present invention.
Figure 4:
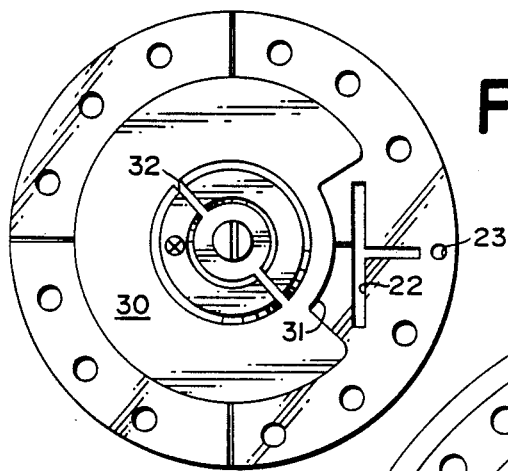
FIG. 4 is a top view of the embodiment shown in FIG. 3.

Referring to FIGS. 3 and 4, a second preferred embodiment comprises a disk shaped body 20 having a plurality of adhesive locking apertures 21, a tape rule slot 22, a string hole 23 and a threaded stem tube bore 24. A hollow cylindrical threaded stem tube 25 with a flange 26 at one end is threaded into the disk shaped body 20 through the threaded stem tube bore 24. A knurled threaded collar 34 is mounted on the stem tube 25 and engaged over the flange 26 on the stem tube 25 and threaded onto a threaded rotating tape lock 30 having a plumb bob slot 32 and a tape rule access aperture 31, thereby allowing the rotating tape lock 30 to reciprocate along the stem tube 25. The rotating tape lock 30 can be rotated so that the tape rule access aperture 31 is positioned over the tape rule slot 22, thereby allowing the tongue of a tape rule TRT to be inserted in the tape rule slot 22. The rotating tape lock 30 can then be rotated so that the tape rule access aperture 31 is no longer over the tape rule slot 22, thereby locking the tape rule tongue TRT in the tape rule slot 22. A set screw 36 is threaded through a set screw bore 38 in the rotating tape lock 30 and extends into the stem tube 25. An anchor nail 37 is mounted inside the stem tube 25 with the head abutting against the set screw 36 and the point adjustably projecting through the stem tube 25 and beyond the bottom of the disk shaped body 20 through an anchor point aperture 40. A spring 41 inside the stem tube 25 biases the rotating tape lock 30 away from the stem tube 25 and biases the flange 26 into contact with the knurled threaded collar 34. A depth adjustment screw 42 is threaded through a depth adjustment screw aperture 44 in the rotating tape lock 30 and bears against the flange 26 to control the penetration of the anchor nail 37 beyond the bottom of the disk shaped body 20.

A bulk adhesive 46 is applied along the periphery of the bottom of the disk shaped body 20 and extrudes through the adhesive locking apertures 21 and onto the other side of the disk shaped body 20, locking the bulk adhesive 46 into place.

The anchor nail 37 is used for anchoring the base-point anchor on surfaces in which the actual surface may not adhere sufficiently strongly to the body of the construction member. For example, for untreated wood, the raised wood fibers on the surface of the wood will separate from the wood itself before the bulk adhesive 46 will separate from the wood fibers. Thus, the anchor nail 37 will allow the base-point anchor to be screwed or nailed into the body of the wood, rather than relying solely on adhesion of the bulk adhesive 46 to the wood fibers. The rotating tape lock 30 provides a wide base on which the user can push so that the anchor nail 37 can be driven into a construction surface without special tools.

Figure 6:
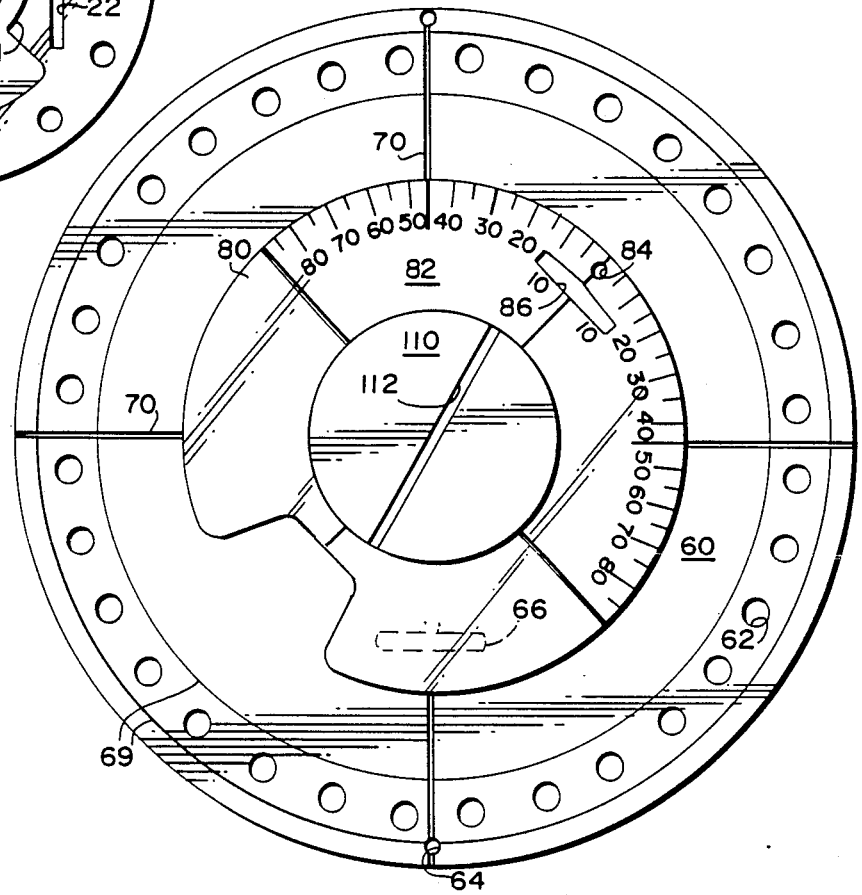
FIG. 6 is a top view of the embodiment shown in FIG. 5.
Figure 5:
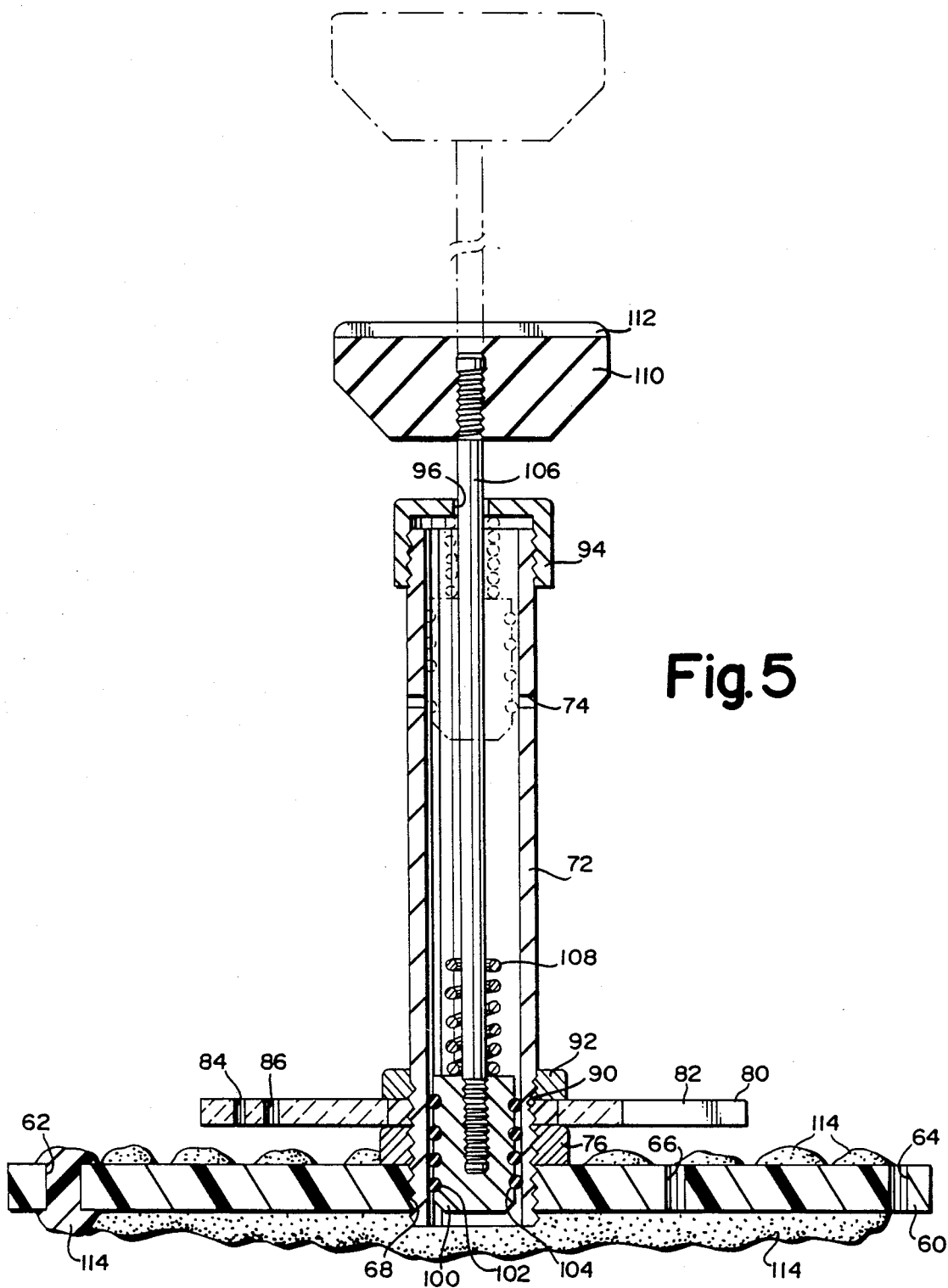
FIG. 5 is a sectional view of a third preferred embodiment of the present invention.

Referring to FIGS. 5 and 6, a third preferred embodiment of this invention comprises a disk shaped body 60 made of transparent acrylic plastic having a plurality of adhesive locking apertures 62, a string hole 64, a tape rule slot 66, and a threaded stem tube aperture 68, with adhesive spread verification lines 69 and perpendicular grid lines 70 marked thereon. A hollow cyclindrical stem tube 72 having an air vent 74 is threaded into the threaded stem tube aperture 68. A first threaded retaining collar 76 is threaded onto the stem tube 72 and abuts against the disk shaped body 60. A rotating tape lock 80 made of ⅛" clear plexiglass having an integral angle protractor 82, a tape lock string hole 84, a tape lock tape rule slot 86 and a stem tube aperture 90 is rotatably mounted on the stem tube 72 through the stem tube aperture 90 and abutting against the first threaded retaining collar 76. The integral angle protractor 82 allows the user to measure angles from a previously laid line. A second threaded retaining collar 92 is threaded onto the stem tube 72 abutting against the rotating tape lock 80 in order to retain the rotating tape lock 80 on the stem tube 72 between the first threaded retaining collar 76 and the second threaded retaining collar 92. A stem tube cap 94 having a plunger rod aperture 96 is threaded onto the stem tube 72. A cylindrical plunger core 100 having a slightly smaller diameter than the bore of the stem tube 72 and having annular grooves 102 along its periphery is placed in the bore of the stem tube 72. A flexible "O" ring 104 is seated in each of the grooves 102 and forms an airtight seal between the plunger core 100 and the bore of the stem tube 72. A plunger rod 106 is attached to the plunger core 100 and extends through the plunger rod aperture 96 and outside the stem tube 72. A coil spring 108 is mounted around the plunger rod 106 abutting the plunger core 100 so that the spring will bias the plunger core 100 away from the stem tube cap 94 as the plunger core 100 abuts against the stem tube cap 94. A plunger handle 110 having a plumb bob slot 112 is mounted on the end of the plunger rod 106 opposite the plunger core 100.

A bulk adhesive 114 is applied to the bottom of the disk shaped body 60 continuously along its periphery and extrudes through the adhesive locking apertures 62 and onto the other side of the disk shaped body 60, locking the bulk adhesive 114 into place. When the base-point anchor of this embodiment is attached to a surface, the bulk adhesive 114 conforms to the irregularities of the surface and creates an airtight seal between the body 60 of the base-point anchor and the surface. If the cylindrical plunger core 100 is displaced towards the stem tube cap 94 by pulling on the plunger handle 110, the space between the surface and the body 60 of the base-point anchor will be evacuated, thereby causing the base-point anchor to adhere even more strongly to the surface.

While the present invention has been disclosed in connection with the preferred embodiments described herein, it should be understood that there may be other embodiments which fall within the spirit and scope of the invention, as defined by the claims. For example, and not by way of limitation, the body could be square or some other shape to facilitate placing the anchor in corners or other environments that impose size or shape constraints.

What is claimed is:

1. A base-point anchor comprising:
   a body having an adhesive locking cavity and an anchor aperture; and
   a bulk adhesive adhering to the surface of said body and extruded into said adhesive locking cavity;
   wherein said bulk adhesive does not harden and remains pliable and adherent after exposure to air.

2. A base-point anchor comprising:
   a body having a plurality of adhesive locking apertures and an anchor aperture; and
   a bulk adhesive adhering to the surface of said body and extruded into said adhesive locking apertures;
   wherein said bulk adhesive does not harden and remains pliable and adherent after exposure to air.

3. A base-point anchor, comprising:
   a substantially planar body having a plurality of adhesive locking apertures and an anchor aperture;
   a handle attached to one surface of said body; and
   a bulk adhesive adhering to the surface of said body opposite said handle and extruded into said adhesive locking apertures;
   wherein said bulk adhesive does not harden and remains pliable and adherent after exposure to air.

4. A base-point anchor, comprising:
   a disk shaped body having a plurality of peripherally spaced adhesive locking apertures, a string hole, a tape rule slot and a threaded stem tube aperture;
   a hollow cylindrical stem tube having an air vent threaded into said threaded stem tube aperture;
   a first threaded retaining collar threaded onto said stem tube and abutting said disk shaped body;
   a rotating tape lock having a string hole, a tape rule slot and a stem tube aperture rotatably mounted on said stem tube through said stem tube aperture and abutting said first threaded retaining collar;
   a second threaded retaining collar threaded onto said stem tube and abutting said rotating tape lock, whereby said rotating tape lock is retained on said stem tube between said first threaded retaining collar and said second threaded retaining collar;
   a stem tube cap having a plunger rod aperture attached to the end of said stem tube opposite the end attached to said disk shaped body;
   a cylindrical plunger core having a slightly smaller diameter than the bore of said stem tube and also having annular grooves along its periphery movably placed in the bore of said stem tube;
   a plurality of flexible "O" rings seated in said annular grooves and forming an airtight seal between said plunger core and the bore of said stem tube;
   a plunger rod attached to said plunger core and extending through said plunger rod aperture and outside said stem tube;

a spring mounted on said plunger rod abutting said plunger core, whereby said spring will bias said plunger core away from said stem tube cap as said plunger core abuts said stem tube cap;

a plunger handle having a plumb bob slot mounted on the end of said plunger rod opposite said plunger core; and a bulk adhesive applied to the surface of said disk shaped body opposite said stem tube and extruded through said adhesive locking apertures onto the surface of said disk shaped body on which said stem tube is mounted.

5. A base-point anchor, as described in any one of claims 1, 2, 3 or 4, wherein said bulk adhesive is applied to said body to a thickness of approximately ¼ inch.

6. A base-point anchor, as described in claim 5, wherein said body comprises a transparent plastic.

* * * * *